US011288797B2

(12) United States Patent
Gilboa-Solomon et al.

(10) Patent No.: US 11,288,797 B2
(45) Date of Patent: Mar. 29, 2022

(54) SIMILARITY BASED PER ITEM MODEL SELECTION FOR MEDICAL IMAGING

(71) Applicant: International Business Machines Corporation, Armonk, NY (US)

(72) Inventors: Flora Gilboa-Solomon, Haifa (IL); Efrat Hexter, Beit Shemesh (IL); Dana Levanony, Tel Aviv (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/923,155

(22) Filed: Jul. 8, 2020

(65) Prior Publication Data
US 2022/0012872 A1 Jan. 13, 2022

(51) Int. Cl.
*G06K 9/00* (2022.01)
*G06T 7/00* (2017.01)
*G06K 9/62* (2022.01)
*G06N 20/00* (2019.01)
*G06V 10/75* (2022.01)

(52) U.S. Cl.
CPC .......... *G06T 7/0012* (2013.01); *G06K 9/6215* (2013.01); *G06K 9/6232* (2013.01); *G06K 9/6262* (2013.01); *G06N 20/00* (2019.01); *G06V 10/751* (2022.01)

(58) Field of Classification Search
None
See application file for complete search history.

(56) References Cited

U.S. PATENT DOCUMENTS

| | | | |
|---|---|---|---|
| 9,330,336 B2 | 5/2016 | Tajbakhsh | |
| 10,993,653 B1* | 5/2021 | Thomas | A61B 5/4227 |
| 2018/0137626 A1 | 5/2018 | Lawrenson | |
| 2019/0286652 A1* | 9/2019 | Habbecke | G16H 30/20 |
| 2020/0012917 A1 | 1/2020 | Pham | |
| 2020/0161005 A1* | 5/2020 | Lyman | G06N 3/084 |

FOREIGN PATENT DOCUMENTS

WO 2018222755 A1 12/2018

* cited by examiner

*Primary Examiner* — Soo Jin Park
(74) *Attorney, Agent, or Firm* — Gregory J Kirsch

(57) ABSTRACT

Embodiments may include techniques to choose a model based on a similarity of computed features of an input to computed features of several models in order to improve feature analysis using Machine Learning models. A method of image analysis may comprise extracting a training feature vector corresponding to each of the plurality of machine learning models from each validation image from a plurality of machine learning models trained using a plurality of validation images, extracting from a new image a new feature vector corresponding to each of the plurality of machine learning models, comparing each new feature vector corresponding to each machine learning model with the training feature vector corresponding to each of the plurality of machine learning models, and selecting and outputting an inference for the new image generated by the machine learning model for which the new feature vector and the training feature vector are most similar.

20 Claims, 3 Drawing Sheets

SIMILARITY BASED PER ITEM MODEL SELECTION FOR MEDICAL IMAGING

BACKGROUND

The present invention relates to choosing a model based on a similarity of computed features of an input to computed features of the training data of several models, in order to improve feature analysis using Machine Learning models, wherein the similarity of an input item to the training data used for each existing Machine Learning model may be determined, and the model whose training data is the most similar to the input item may be selected to be utilized to analyze the input item.

Machine Learning models may be used to analyze medical images and identify salient features in such images. For example, features such as tumors, abnormal tissue, etc., may be identified. However, it is well known that there are significant differences in physical properties of patients from different ethnicities and of different ages, and quite possibly other parameters or groupings, such as gender and body mass. Additionally, different types of finding, such as tumors and calcifications also have different physical properties. In some cases, Machine Learning models trained on a specific group may perform better at identifying salient features than models trained on a mixed or general population. So, for example, it may be that results of analyzing a mammogram using a model for a particular group would be more reliable for a population of that group than analyzing the same mammogram using a general model. However, conventional techniques typically use one model to analyze all images, or groups of images, without regard to parameters such as ethnicity, age, gender, body mass, etc.

Accordingly, a need arises for techniques to analyze medical images that are sensitive to differences in such parameters in order to improve feature analysis using Machine Learning models.

SUMMARY

Embodiments may include techniques to choose a model based on a similarity of computed features of an input to computed features of several models. For example, for each input item, such as a medical image, the similarity of an input item to the training data used for each existing Machine Learning model may be determined, and the model whose training data is the most similar to the input item may be selected to be utilized to analyze the input item.

For example, in an embodiment, a method of image analysis may be implemented in a computer system comprising a processor, memory accessible by the processor, and computer program instructions stored in the memory and executable by the processor, and the method may comprise extracting at least one training feature vector corresponding to each of the plurality of machine learning models from each validation image from a plurality of machine learning models trained using a plurality of validation images, extracting from a new image at least one new feature vector corresponding to each of the plurality of machine learning models, comparing each new feature vector corresponding to each machine learning model with the at least one training feature vector corresponding to each of the plurality of machine learning models, and selecting and outputting an inference for the new image generated by the machine learning model for which the new feature vector and the at least one training feature vector are most similar.

In embodiments, each of the plurality of machine learning models may be trained using training images corresponding to different human physical characteristics. They may also be trained using images corresponding to different types of findings. The human physical characteristics may comprise at least one of age, gender, body mass, and ethnicity. The types of findings may correspond to at least one of tumor, calcification, asymmetry, and stenosis. The comparing may be performed using at least one of a cosine similarity function, a root mean square distance, L0, L1, L2 norms, and Locality Sensitive Hashing. The method may further comprise computing a similarity score based on a result of the comparing. The similarity score may be computed using at least one of a highest similarity scores, a mean of a fixed number of highest similarity scores, and a proportion of training samples whose similarity score is above a threshold. The output inference may be an inference generated by the machine learning model selected based on the computed similarity score.

In an embodiment, a system for image analysis may comprise a processor, memory accessible by the processor, and computer program instructions stored in the memory and executable by the processor to perform extracting at least one training feature vector corresponding to each of the plurality of machine learning models from each validation image from a plurality of machine learning models trained using a plurality of validation images, extracting from a new image at least one new feature vector corresponding to each of the plurality of machine learning models, comparing each new feature vector corresponding to each machine learning model with the at least one training feature vector corresponding to each of the plurality of machine learning models, and selecting and outputting an inference for the new image generated by the machine learning model for which the new feature vector and the at least one training feature vector are most similar.

In an embodiment, a computer program product for image analysis, the computer program product may comprise a non-transitory computer readable storage having program instructions embodied therewith, the program instructions executable by a computer, to cause the computer to perform a method comprising extracting at least one training feature vector corresponding to each of the plurality of machine learning models from each validation image from a plurality of machine learning models trained using a plurality of validation images, extracting from a new image at least one new feature vector corresponding to each of the plurality of machine learning models, comparing each new feature vector corresponding to each machine learning model with the at least one training feature vector corresponding to each of the plurality of machine learning models, and selecting and outputting an inference for the new image generated by the machine learning model for which the new feature vector and the at least one training feature vector are most similar.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include techniques to choose a model based on a similarity of computed features of an input to computed features of several models. For example, for each input item, such as a medical image, the similarity of an input item to the training data used for each existing Machine Learning model may be determined, and the model whose training data is the most similar to the input item may be selected to be utilized to analyze the input item.

In embodiments, each trained model may have samples that were used for training. For each sample, inference, such as a prediction of a salient feature, may be performed using the trained model, and one or more of the feature vectors produced in that inference may be saved. The saved feature vectors may include, for example, the last feature vectors before a fully connected part of a Deep Neural Network (DNN), or any combination of features.

Thus, several collections of feature vectors may be obtained, one collection for each model. Note that in medical imaging, these collections may be much smaller than collections of the all the training images. In production usage, inference may be performed on the input with all the trained models, and the same type of feature vectors as saved in the collections may be extracted. These new feature vectors may be compared to at least some of the saved training feature vectors in the collections. A feature vector may only be compared to the feature vectors associated with the model that produced the feature vector. Cosine similarity, for example, may be used for the comparison, but embodiments may use other methods. The final result of the comparison per model may be one or more of a number of metrics, such as the highest similarity score, the mean of a fixed number of highest scores, the proportion of training samples whose similarity score is above a threshold, etc. The inference conclusion of the model with the highest similarity score may be selected for use on that input image.

Figure 1:
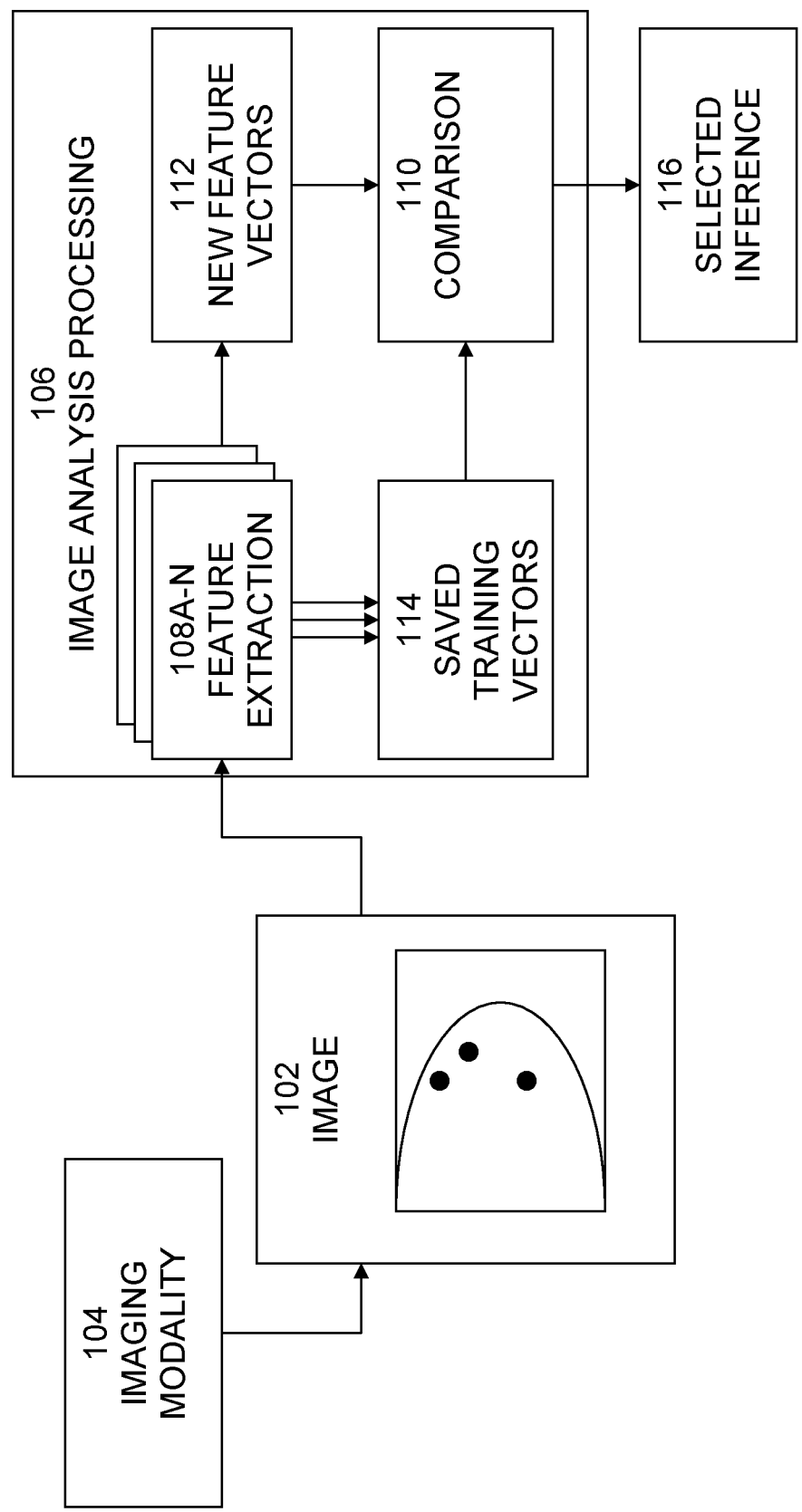
FIG. 1 is an exemplary block diagram of an image analysis processing system according to embodiments of the present techniques.

An exemplary block diagram of an image processing system according to embodiments of the present techniques is shown in FIG. 1. As shown in this example, one or more images 102, such as medical images, may be obtained using imaging modalities 104 and may be analyzed by image analysis processing block 106. Imaging modalities may include, for example, ultrasound imaging, CT imaging, and MRI imaging, Mammography, Tomography, etc.

Image analysis processing block 106 may include one or more feature extraction processing 108A-N and comparison processing 110. Feature extraction processing 108A-N may include routines to analyze input images 102 and to extract salient features from the input images. Feature extraction processing 108A-N may utilize a plurality of machine learning models that provide the artificial intelligence used to isolate and recognize salient features in the input images. In embodiments, feature extraction processing 108A-N may include a plurality of processing blocks, each block utilizing a different machine learning model, as shown in the example of FIG. 1. In embodiments, feature extraction processing 108A-N may include a single processing block that may utilize a plurality of different machine learning models.

Figure 2:
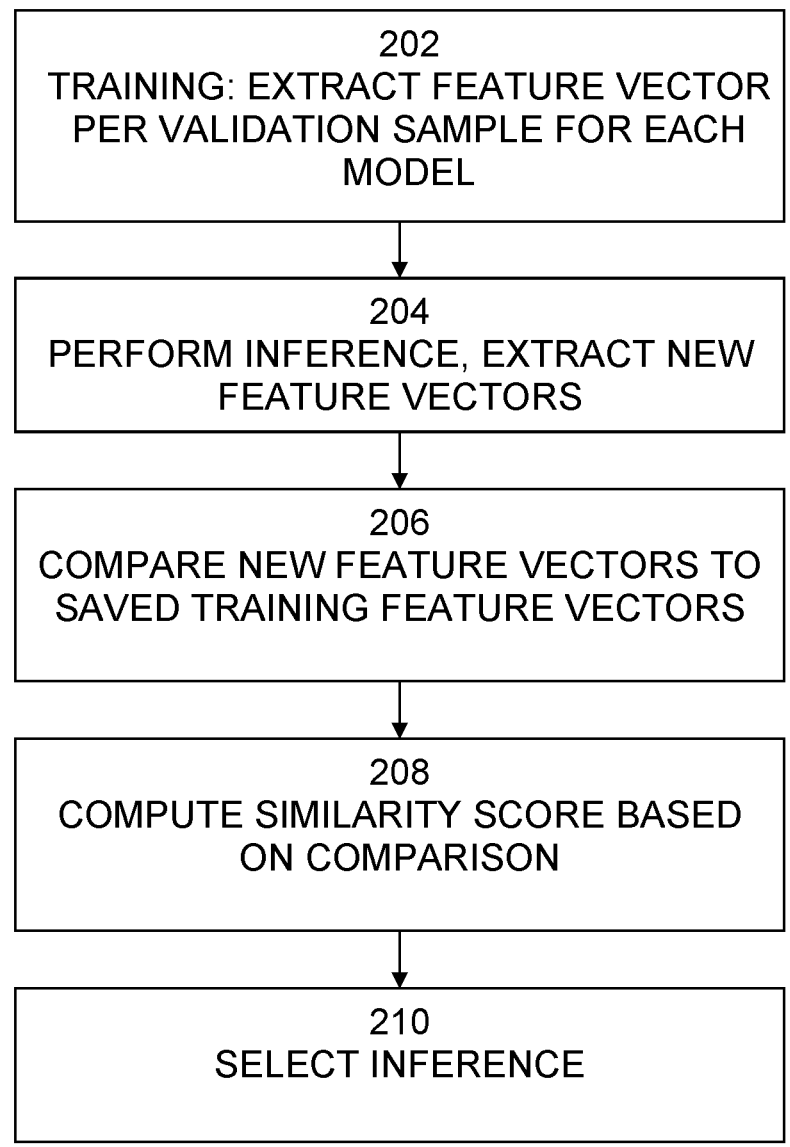
FIG. 2 is an exemplary flow diagram of a process of image analysis according to embodiments of the present techniques.

An example of a process 200 according to embodiments of the present techniques is shown in FIG. 2. It is best viewed in conjunction with FIG. 1. In this example, process 200 may begin with 202, in which during training time, for each machine learning model, feature extraction processing 108A-N may extract a training feature vector from each validation sample image. The machine learning models may be trained using training images corresponding to different human physical characteristics and/or using images corresponding to different types of findings. For example, the human physical characteristics may comprise at least one of age, gender, body mass, and ethnicity, etc. For example, the types of findings may correspond to at least one of tumor, calcification, asymmetry, and stenosis, etc. These training feature vectors may be stored 114. At 204, during production or deployment processing, feature extraction processing 108A-N may be used to perform inference processing on each input image 102. Inference processing may be performed by feature extraction processing 108A-N using all the trained machine learning models on each input image 102, to generate a set of new feature vectors 112 comprising at least one new feature vector extracted for each machine learning model.

At 206, new feature vectors 112 may be compared 110 to all the saved training feature vectors 114. In embodiments, a new feature vector produced by a particular machine learning model may only be compared to saved training feature vectors associated with the same machine learning model. In embodiments, the comparison may be performed using a cosine similarity function. Embodiments may use other similarity functions or methods, such as root mean square distance, L0, L1, L2 norms, and Locality Sensitive Hashing.

At 208, a similarity score may be computed based on results of the comparison. In embodiments, the similarity score may be the highest similarity score, the mean of a fixed number of highest scores, the proportion of training samples whose similarity score is above a threshold, etc. Additionally, One Class Classification may be used to assess the similarity of the new feature vector to the plurality of the training feature vectors. At 210, the inference conclusion produced by the model with the highest similarity score may be selected 116.

Figure 3:
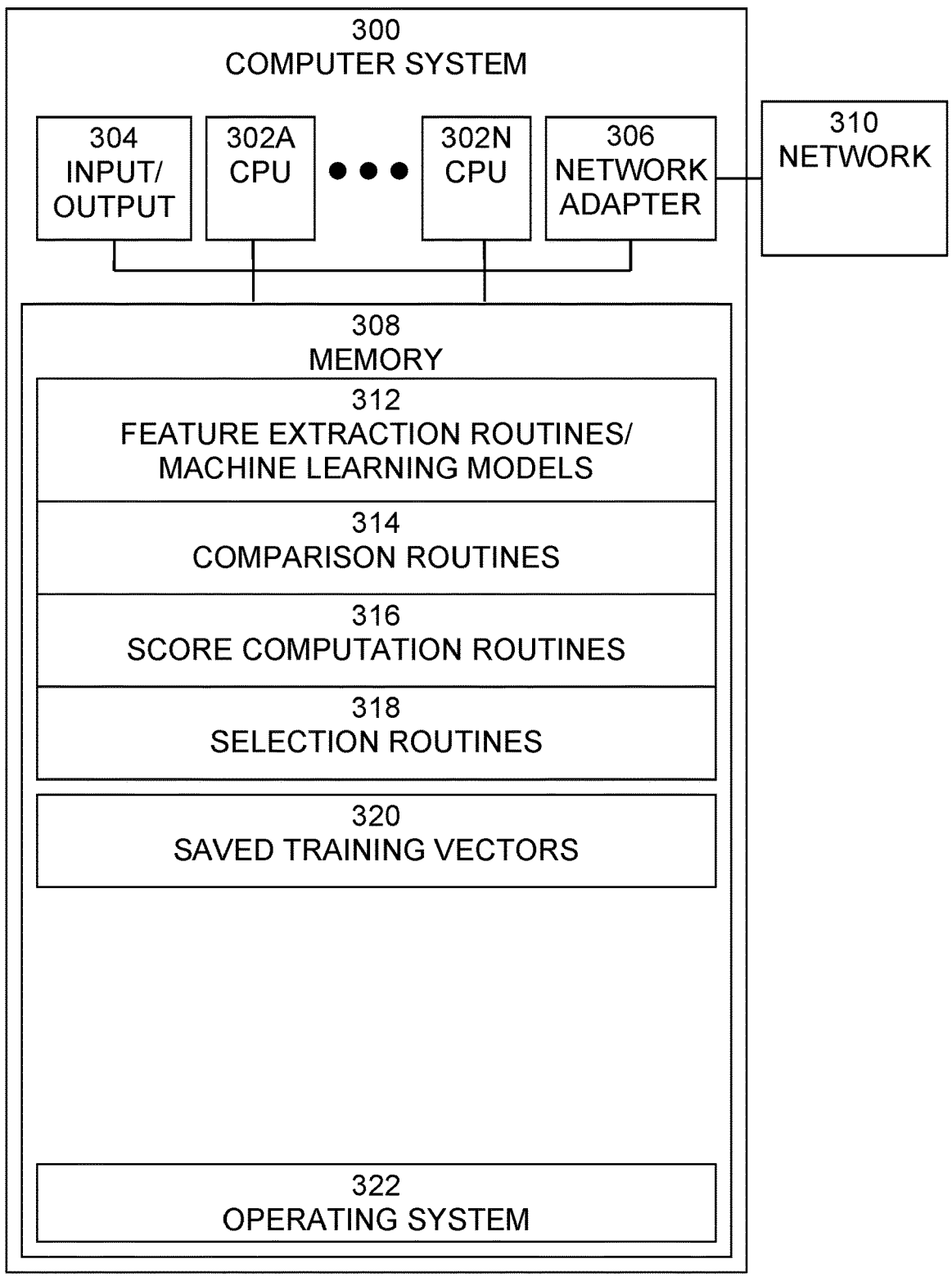
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include feature extraction routines/machine learning models 312, comparison routines 314, score computation routines 316, selection routines 318, saved training vectors 320, and operating system 322. Feature extraction routines/machine learning models 312 may include software routines to analyze input images and to extract salient features from the input images using a plurality of machine learning models that provide the artificial intelligence used to isolate and recognize salient features in the input images, as described above. Comparison routines 314 may include software routines to compare new feature vectors to all the saved training feature vectors 320, as described above. Score computation routines 320 may include software routines to compute a similarity score based on the comparison, as described above. Selection routines 318 may include software routines to select an inference conclusion produced by the model with the highest similarity score, as described above. Saved training vectors 320 may include training feature vectors extracted from each validation sample image, as described above. Operating system 322 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of image analysis, implemented in a computer system comprising a processor, memory accessible by the processor, and computer program instructions stored in the memory and executable by the processor, the method comprising:
   extracting a plurality of training feature vectors corresponding to each of a plurality of machine learning models from each validation image from a plurality of machine learning models trained using a plurality of validation images;
   extracting from a new image a plurality of new feature vectors corresponding to each of the plurality of machine learning models;
   comparing each of the plurality of new feature vectors corresponding to each of the plurality of machine learning models with the plurality of training feature vectors corresponding to each of the plurality of machine learning models; and
   selecting a machine learning model and outputting an inference for the new image generated by a selected machine learning model for which a selected new feature vector of the plurality of new feature vectors and a selected training feature vector of the plurality of training feature vectors are most similar.

2. The method of claim 1, wherein each of the plurality of machine learning models is trained using training images corresponding to different human physical characteristics comprising at least one of age, gender, body mass, and ethnicity.

3. The method of claim 2, wherein each of the plurality of machine learning models is trained using training images corresponding to different types of findings comprising at least one of tumor, calcification, asymmetry, and stenosis.

4. The method of claim 3, wherein the comparing is performed using at least one of a cosine similarity function, a root mean square distance, L0, L1, L2 norms, and Locality Sensitive Hashing.

5. The method of claim 4, further comprising computing a plurality of similarity scores based on a result of the comparing.

6. The method of claim 5, wherein the plurality of similarity scores are computed using at least one of a highest similarity score, a mean of a fixed number of highest similarity scores, and a proportion of training samples whose similarity score is above a threshold.

7. The method of claim 6, wherein the output inference is an inference generated by the machine learning model selected based on the computed similarity score.

8. A system for image analysis, the system comprising a processor, memory accessible by the processor, and computer program instructions stored in the memory and executable by the processor to perform:
   extracting a plurality of training feature vectors corresponding to each of a plurality of machine learning models from each validation image from a plurality of machine learning models trained using a plurality of validation images;
   extracting from a new image a plurality of new feature vectors corresponding to each of the plurality of machine learning models;
   comparing each of the plurality of new feature vectors corresponding to each of the plurality of machine learning models with the plurality of training feature vectors corresponding to each of the plurality of machine learning models; and
   selecting a machine learning model and outputting an inference for the new image generated by a selected machine learning model for which a selected new feature vector of the plurality of new feature vectors and a selected training feature vector of the plurality of training feature vectors are most similar.

9. The system of claim 8, wherein each of the plurality of machine learning models is trained using training images corresponding to different human physical characteristics comprising at least one of age, gender, body mass, and ethnicity.

10. The system of claim 9, wherein each of the plurality of machine learning models is trained using training images corresponding to different types of findings comprising at least one of tumor, calcification, asymmetry, and stenosis.

11. The system of claim 10, wherein the comparing is performed using a cosine similarity function.

12. The system of claim 11, further comprising computing a plurality of similarity scores based on a result of the comparing.

13. The system of claim 12, wherein the plurality of similarity scores are computed using at least one of a highest similarity score, a mean of a fixed number of highest similarity scores, and a proportion of training samples whose similarity score is above a threshold.

14. The system of claim 13, wherein the output inference is an inference generated by the machine learning model selected based on the computed similarity score.

15. A computer program product for image analysis, the computer program product comprising a non-transitory computer readable storage having program instructions embodied therewith, the program instructions executable by a computer, to cause the computer to perform a method comprising:
   extracting a plurality of training feature vectors corresponding to each of a plurality of machine learning models from each validation image from a plurality of machine learning models trained using a plurality of validation images;
   extracting from a new image a plurality of new feature vectors corresponding to each of the plurality of machine learning models;
   comparing each of the plurality of new feature vectors corresponding to each of the plurality of machine learning models with the plurality of training feature vectors corresponding to each of the plurality of machine learning models; and
   selecting a machine learning model and outputting an inference for the new image generated by a selected machine learning model for which a selected new feature vector of the plurality of new feature vectors and a selected training feature vector of the plurality of training feature vectors are most similar.

16. The computer program product of claim 15, wherein each of the plurality of machine learning models is trained using training images corresponding to different human physical characteristics comprising at least one of age, gender, body mass, and ethnicity.

17. The computer program product of claim 16, wherein each of the plurality of machine learning models is trained using training images corresponding to different types of findings comprising at least one of tumor, calcification, asymmetry, and stenosis.

18. The computer program product of claim 17, wherein the comparing is performed using at least one of a cosine similarity function, a root mean square distance, L0, L1, L2 norms, and Locality Sensitive Hashing.

19. The computer program product of claim 18, further comprising computing a plurality of similarity scores based on a result of the comparing.

20. The computer program product of claim 19, wherein the plurality of similarity scores are computed using at least one of a highest similarity score, a mean of a fixed number of highest similarity scores, and a proportion of training samples whose similarity score is above a threshold, and the output inference is an inference generated by the machine learning model selected based on the computed similarity score.

* * * * *